United States Patent

[11] 3,596,434

| [72] | Inventor | Seymour Zelnick<br>Orange, N.J. |
|---|---|---|
| [21] | Appl. No. | 56,044 |
| [22] | Filed | June 24, 1970 |
| [45] | Patented | Aug. 3, 1971 |
| [73] | Assignee | Weldotron Corporation<br>Newark, N.J.<br>Continuation of application Ser. No.<br>706,601, Feb. 19, 1968, now abandoned. |

[54] AUTOMATIC PALLET WRAPPING MACHINE
4 Claims, 5 Drawing Figs.

[52] U.S. Cl. .................................................. 53/198R, 53/182
[51] Int. Cl. .................................................. B65b 11/10, B65b 27/00
[50] Field of Search ........................................... 53/3, 28, 180, 182, 198, 229

[56] References Cited
UNITED STATES PATENTS

| 2,909,877 | 10/1959 | Cummings et al. | 53/180 |
| 3,191,356 | 6/1965 | Zelnick et al. | 53/182 |
| 3,236,024 | 2/1966 | Bradley et al. | 53/198 |

*Primary Examiner*—Theron E. Condon
*Assistant Examiner*—Neil Abrams
*Attorney*—Harry Cohen

ABSTRACT: The system provides a vertical sleeve about a loaded pallet. The pallet is advanced into a curtain of film to form a bight which is sealed therebehind under tension by a pair of clamping sealing jaw assemblies. The assemblies, however, release the tension in the web where the seal is made, by initially forming a bulge between two spaced apart clamping lines, which is subsequently relaxed before sealing heat is applied thereto.

PATENTED AUG 3 1971

INVENTOR.
SEYMOUR ZELNICK

BY Harry Cohn

ATTORNEY

INVENTOR.
SEYMOUR ZELNICK
ATTORNEY

3,596,434

AUTOMATIC PALLET WRAPPING MACHINE

CROSS-REFERENCE TO RELATED APPLICATION

This application is a continuation of application Ser. No. 706,601 filed Feb. 19, 1968 now abandoned.

BACKGROUND OF THE INVENTION

1. Field of the Invention

This invention relates to a method and apparatus for heat sealing and cutting superposed thermoplastic films, and especially for forming a tight sleeve of film about an article.

2. Description of the Prior Art

The packaging of articles in thermoplastic film is well known. Advantageously, the film is heat shrinkable, is initially sealed around the article, and is subsequently heated to shrink the film tightly about the article. This initial sealed wrap may be accomplished manually, as for example, shown in U.S. Pat. No. 3,047,991, issued to M. Siegel et al. on Aug. 7, 1962; or automatically, as for example, shown in U.S. Pat. No. 3,191,356, issued to S. Zelnick et al., on June 29, 1965. This heating may be accomplished automatically, as for example, shown in U.S. Pat. No. 3,222,800, issued to M. Siegel et al., on Dec. 14, 1965.

In U.S. Pat. application Ser. No. 700,116 filed on Jan. 24, 1968, by S. Zelnick, there is shown a method and an apparatus for shrink-film wrapping a pallet load. A load of product on a pallet is wrapped with a heat shrinkable thermoplastic film which is subsequently shrunk so that the entire pallet load is unitized, stabilized and protected against detrimental environmental conditions.

SUMMARY OF THE INVENTION

It is an object of this invention to provide an extremely tight sleeve of film around an article prior to the shrinking operation, which is especially useful in the system of Ser. No. 700,116 supra.

A feature of this invention includes initially advancing the article into a curtain or web of film, which pulls the film from a supply along therewith, and then closing a pair of clamping and heat sealing jaw assemblies onto the bight of the film behind the article. As the jaw assemblies begin to close behind the article, tension is increased on the web supply until the film stretches as the jaws continue to close, thus producing an extremely tight sleeve. The jaw assemblies, however, along the seal line, provide a tension free portion of superposed webs of film, which may be sealed without gaps or defects.

BRIEF DESCRIPTION OF THE DRAWING

These and other objects, features and advantages of the invention will be apparent from the following specification thereof, taken in conjunction with the accompanying drawing in which.

DESCRIPTION OF THE INVENTION

Figure 1:
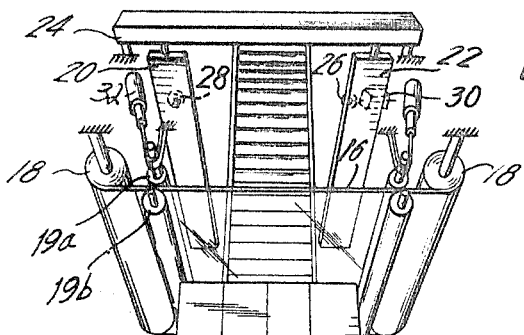
FIGS. 1, 2 and 3 are schematic perspective views showing three successive stages in a system for the formation of a vertical sleeve about a loaded pallet.
Figure 2:
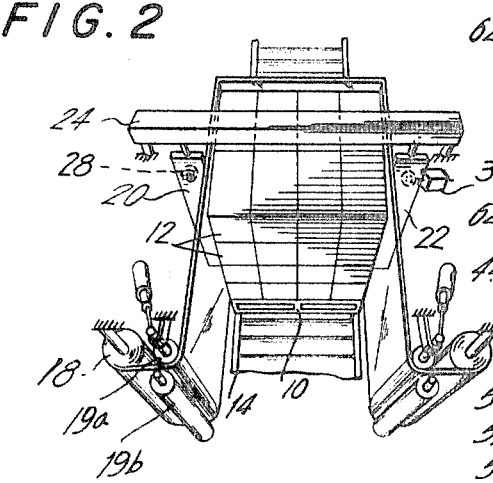
Figure 3:
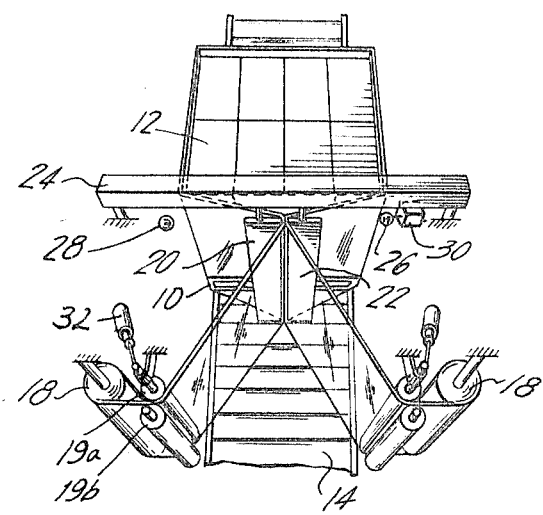

As shown in FIG. 1, the pallet 10 bearing a load of product, such as stacked boxes 12, is carried by an infeed conveyor 14 in the direction of the arrow A. The loaded pallet may be disposed on the conveyor by a forklift truck. The conveyor is normally running, but as the forklift truck approaches, it actuates a pressure actuated pad switch to halt the conveyor. The conveyor remains halted until the forklift truck has backed away sufficiently to release the switch. Then the conveyor resumes running. A curtain or web of film, which film has at least some resiliency, extends across the conveyor and unwinds from two vertically journaled supply rolls 18. A pair of clamping-sealing jaw assemblies 20 and 22 extend vertically and are supported between an overhead, horizontal guide member 24 and a lower, horizontal guide member, not shown, and is laterally movable by suitable means, such as chains or air cylinders, not shown. The loaded pallet is advanced, as shown in FIG. 2, against the curtain of film, and carries the curtain along, unwinding film from the two supply rolls 18 and between two pairs of pinch rolls 19a, 19b. The loaded pallet continues to advance until the trailing edge of the pallet has advanced a sufficient distance beyond the jaw assemblies 20 and 22, so as to clear these assemblies. This position, as shown in FIG. 3, is detected by a photocell 26, energized by a light source 28. The photocell actuates a relay circuit 30 to halt the conveyor and to start the jaw assemblies moving towards each other, to close behind the loaded pallet onto the bight of the web to seal and sever the two superposed webs of film, thus forming a vertical tube or sleeve of film about the loaded pallet and a new curtain of film between the supply rolls for the next successive loaded pallet.

The successful operation of this system requires the production of an extremely tightly fitting sleeve about the loaded pallet, even prior to any final film shrinking operation, since the force of gravity would tend to dislodge a loose sleeve which is vertically oriented.

To accomplish this feature, the following is included in the clamping-sealing operation: initially the curtain of film is kept at a low tension, by permitting relatively free rotation of the supply rolls 18, and the pinch rolls 19a, 19b, and, thereby, the relatively free withdrawal of the film from the supply rolls. However, as the sealing jaw assemblies begin to close behind the loaded pallet, they operate switches, not shown, to actuate air-operated band brakes 32 operating on the pinch rolls until the tension provided by the closing jaw assemblies, deflecting the bight of the web, is sufficient to actually cause the film to stretch as the jaw assemblies continue to close, thereby producing an extremely tight sleeve after the clamping-sealing operation.

While high film tension around the loaded pallet is necessary to provide a tight sleeve, low film tension in the area in which the seal is being formed is necessary to provide a good, continuous seal without gaps or incomplete welds. This is so because customarily the superposed webs which are to be sealed together, are initially clamped together along two parallel, spaced-apart lines. A gap is then melted into the space between these two clamp lines. This gap serves to sever the superposed webs, while the molten material therefrom melts back towards the adjacent clamping lines to form two beads which, properly, are integral with both superposed layers along each side of the gap. If the portions of the web between the clamp lines are under tension, the two layers of web may not be uniformly in mutual contact, and the beads produced by the melt-back material from the gap may not be integral with both layers of web. For example, if each layer forms its own bead from its own melt-back material, these beads may merely be in superficial contact with each other, and not provide a strong weld. This problem was discussed in U.S. Pat. No. 3,191,356, supra, which discloses jaw assemblies having spring loaded surfaces and a pulsed heating wire.

Figure 4:
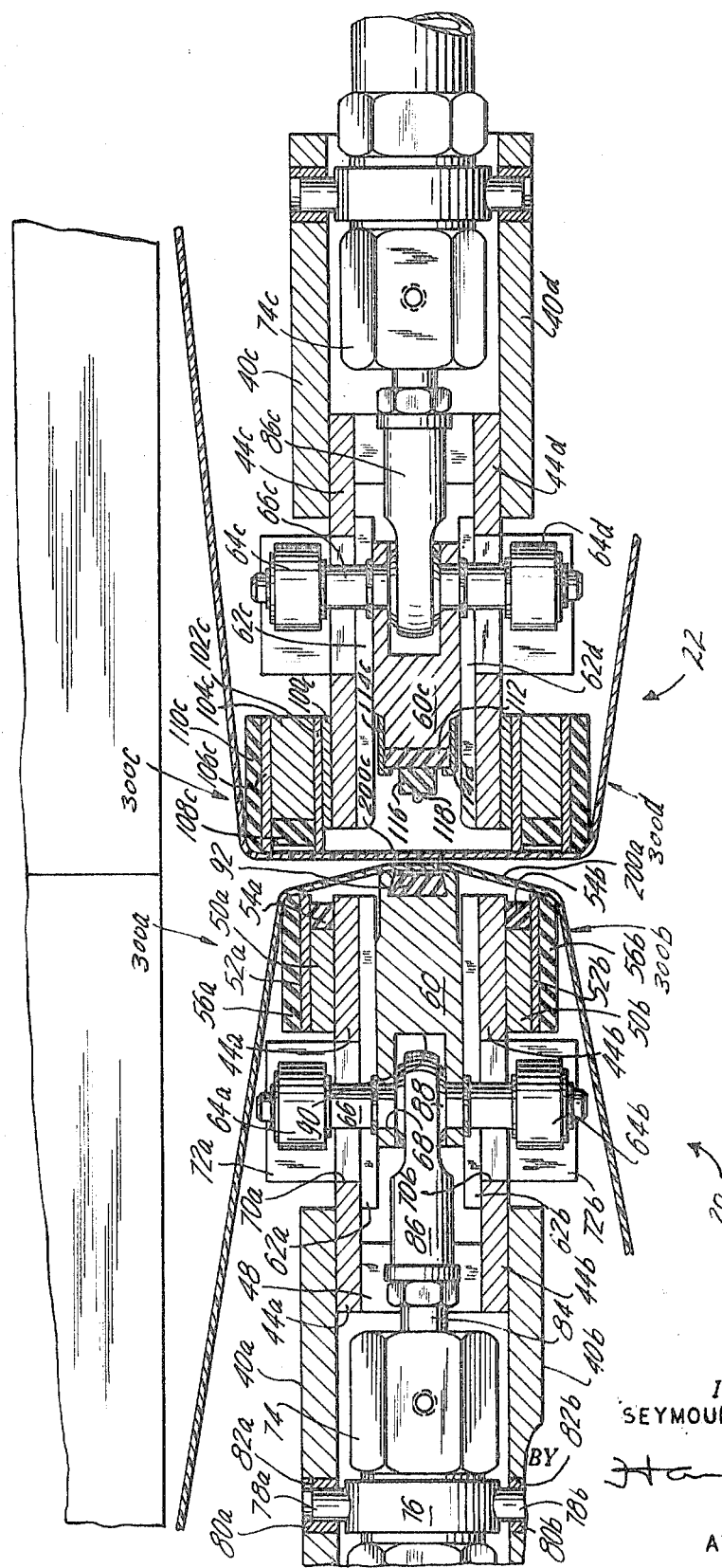
FIG. 4 is a top plan view in cross section of a pair of clamping and heat sealing jaw assemblies for use in the system of FIGS. 1, 2 and 3, showing the assemblies in a closing, but not yet closed, position.

FIG. 4 shows an improved vertical pair of clamping-sealing jaw assemblies 20, 22 which are supported between and movable along a horizontal pair of guide assemblies. Each jaw assembly essentially comprises a pair of spaced-apart clamping surfaces and an intermediate, relatively movable sealing surface.

The jaw assembly 20 includes two spaced-apart outer vertical frame plates 40a, 40b which are respectively secured to two spaced-apart inner vertical frame plates 44a, 44b, which are respectively secured to a plurality of horizontal spacer bars 48. A clamping surface subassembly is provided by a vertical plate 50a secured to the plate 40a, a vertical plate 52 secured to the plate 50a, a vertical plate of elastomeric material 54a secured to the plates 44a, 50a and 52a, and a vertical plate of elastomeric material 56a secured to the plate 52a. A symmetrical set of vertical plates 50b, 52b, 54b and 56b is secured to the vertical plate 44b.

A vertical sealing bar 60 is slidably disposed between the plate 44a, 44b, and is guided between a plurality of guide plates 62a and 62b, respectively secured to the plates 44a and 44b. The sealing bar 60 is vertically supported by an upper and a lower pair of rollers 64a, 64b, respectively mounted on two shafts 66 respectively journaled through two bars 68 through the sealing bar 60. Each of the inner vertical frame plates 44a, 44b is respectively provided with two horizontally elongated slots 77a, 77b, through which the respective shafts 66 pass, and respective two platform lugs 72a, 72b, on which the respective rollers 64a, 64b, roll. An upper and a lower air cylinder 74 are respectively mounted between and to the outer vertical frame plates 40a, 40b, by means of a respective collar 76 having two lugs 78a, 78b, respectively passing into two bushings 80a, 80b, respectively secured in two bores 82a, 82b in the two plates 40a, 40b. The cylinders 74 have respective pistons 84, each having a respective extension 86, respectively terminating in a lug having a respective bore which respectively receives a respective spherical bushing 88, which respectively projects into a posterior groove 90 in the sealing bar 60, and through which bushing passes a respective shaft 66. The sealing bar 60 also has an anterior groove, or dovetail cross section, which has an elastomeric bar 92 of mating dovetail cross section. The two cylinders 74 are adapted to shift the sealing bar 60 between an anterior position, shown in FIG. 4, and a posterior position, shown in FIG. 5.

The jaw assembly 22 is similar to the jaw assembly 20, and includes four similar frame plates 40c, 40d, 44c, 44d, two similar air cylinders 74c, and respective pistons 86c, guide plates 62c, 62d, and shafts 66c and rollers 64c, 64d. Two symmetrical clamping surfaces are provided, each including a vertically extending plate 100c secured to the plate 44c, a vertically extending plate 102c secured to the plate 100c, a vertically extending plate 104c secured to the plate 102c, a vertically extending plate 106c secured to the plate 104c, a vertically extending pad of elastomeric material 108c secured to the plates 102c, 104c, 106c, and a vertically extending pad of elastomeric material 110c secured to the plate 106c. The sealing bar 60c differs from the sealing bar 60 in its anterior end. A first vertically elongated elastomeric bar 112 is secured to the anterior edge of the bar 60c by two right angle retaining members 114c, 114d, secured to the bar 60c. A high temperature resistant, electrically nonconductive bar 116 is secured to the elastomeric bar 112. An electric, radiant heating, resistance wire 118 lies on and is supported by the anterior surface of the bar 116. The wire may be supported under spring tension between two vertically spaced-apart dielectric blocks, not shown.

Figure 5:
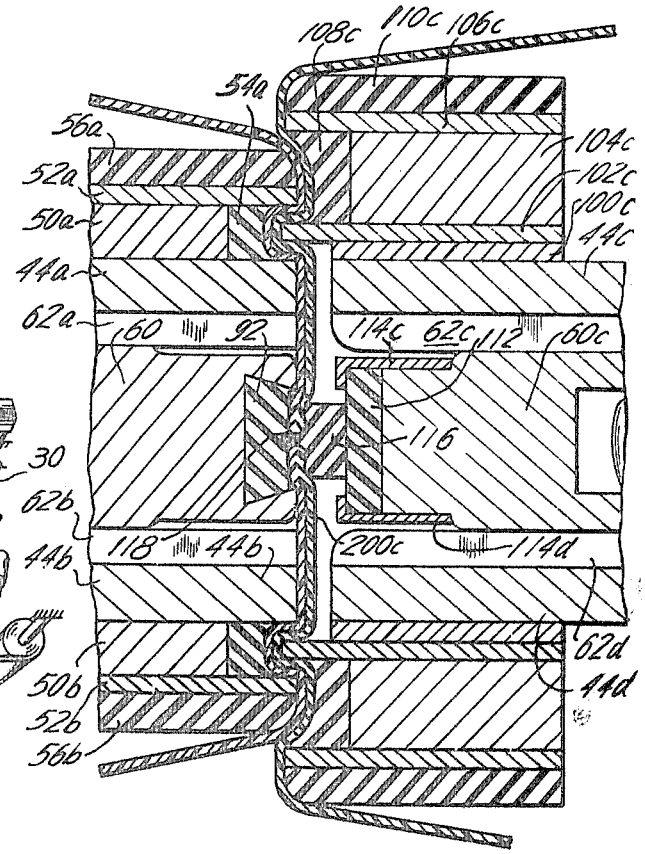
FIG. 5 is a partial top plan view in cross section, similar to FIG. 4, showing the assemblies in the fully closed, clamped and heat sealing position.

In operation, as the jaw assemblies 20 and 22 are brought together, the bar 60 is extended anteriorly of its adjacent clamping subassemblies, and the bar 60c, carrying the normally hot wire 118, is withdrawn posteriorly of its adjacent clamping subassemblies, by their respective air cylinders 74 and 74c, as shown in FIG. 4. Thus the portion 200a of the web between the two clamping subassemblies, 300a and 300b, is bulged out by the bar 60, while the hot wire 118 is out of effective heating range of the portion 200c of the web between the two clamping subassemblies 300c and 300d. As the jaw assemblies closely approach each other, the bar 60 is effective to bulge in the other web portion 200c between its clamping subassemblies 300c and 300d. When the jaw assemblies are fully closed, the opposed clamping subassemblies 300a and 300c, and 300b and 300d, are in interengagement and abutment, thereby clamping the superposed webs along two spaced-apart parallel lines, as shown in FIG. 5. After full clamping of the webs has occurred, the air cylinder 74 withdraws the bar 60 until its anterior face is level with the clamping subassembly anterior surfaces, thereby releasing the tension on the two web portions 200a and 200d between the two clamping lines. Then the air cylinder 74c advances the bar 60c until the superposed web portions are clamped between the bars 92 and 116, and the hot wire 118 has melted a gap into the superposed webs, as shown in FIG. 5. After the gap has been melted in, and the molten material has melted back to form two beads, the air cylinders 86c withdraws the bar 60c and the beads are permitted to cool and harden. If desired, cold air may be blown at the beads to speed their cooling. When the beads have cooled, the jaw assemblies are separated, the conveyor starts moving, and the wrapped, loaded pallet is discharged from the wrapping station, and if desired, may now be heat-shrunk.

While we have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

I claim:

1. Apparatus for providing a sleeve of plastic film tightly around a load on a forklift truck pallet, comprising: a forklift pallet for carrying a load; means for providing a horizontal path for the load carrying pallet; web supply means for supplying and disposing a web of plastic film in vertical position across said path; means for advancing the said pallet and said load thereon against the web of film across said path, to carry the web along said path, withdrawing addition film from said supply means, forming a bight in the web around the load; a pair of clamping-sealing jaw assemblies stradling said path and adapted to close towards each other in vertical planes parallel to each other behind the article onto the bight in the web; power operated means activated during said movement of said jaw assemblies toward each other and opposing withdrawal of the web from the supply means and thereby placing the web under greater tension than the tension resulting from the movement of the pallet and load against the web; means for actuating said opposing means after the load has pulled the web into a bight and passed along the path beyond the jaw assemblies, so that as said jaw assemblies close they deflect the web behind the load, thereby increasing its length, and thereby stretching the two superposed portions of the web therebetween; each of said jaw assemblies including two spaced-apart vertical clamping jaws, whereby said assemblies, when closed on each other, clamp the superposed portions of the web along two spaced-apart lines, and a radiant heat source for melting a gap in the superposed portions of the web together along the gap.

2. Apparatus according to claim 1, wherein fluid-pressure actuated means is coupled to each of said jaw assemblies to move them toward each other in said vertical planes.

3. Apparatus according to claim 1, wherein said power operated means for placing the web under greater tension comprises pinch rolls and fluid-pressure operated band brakes coupled to said pinch rolls to increase the pressure of said pinch rolls against the web upstream of the bight-forming portion of the web.

4. Apparatus according to claim 1, wherein fluid-pressure actuated means is coupled to each of said jaw assemblies to move them toward each other in said vertical planes, and wherein said power operated means for placing the web under greater tension comprises pinch rolls and fluid-pressure operated band brakes coupled to said pinch rolls to increase the pressure of said pinch rolls against the web upstream of the bight-forming portion of the web.